United States Patent [19]

Nozawa

[11] 4,358,543
[45] Nov. 9, 1982

[54] FLUORIDE GLASS

[75] Inventor: Nobuhiro Nozawa, Sagamihara, Japan

[73] Assignee: Kabushika Kaisha Ohara Kogaku Garasu Seizosho, Kanagawa, Japan

[21] Appl. No.: 188,486

[22] Filed: Sep. 18, 1980

[30] Foreign Application Priority Data

Oct. 4, 1979 [JP] Japan .................................. 54/127315

[51] Int. Cl.$^3$ ................................................ C03C 3/00
[52] U.S. Cl. ........................................ 501/40; 501/44; 501/73
[58] Field of Search ...................... 106/47 Q, 47 R, 52; 501/40, 44, 73

[56] References Cited

U.S. PATENT DOCUMENTS

| 2,578,325 | 12/1951 | Sun et al. | 106/47 Q |
| 3,847,624 | 11/1974 | Broemer et al. | 106/47 Q |
| 4,040,846 | 8/1977 | Broemer et al. | 106/47 Q |
| 4,142,986 | 3/1979 | Rapp | 106/47 Q |

FOREIGN PATENT DOCUMENTS

| 1496656 | 11/1971 | Fed. Rep. of Germany | 106/47 Q |
| 54-129016 | 10/1979 | Japan | 106/47 Q |
| 1405717 | 9/1975 | United Kingdom | 106/47 Q |
| 535235 | 12/1976 | U.S.S.R. | 106/47 Q |

*Primary Examiner*—Mark Bell
*Attorney, Agent, or Firm*—Ladas & Parry

[57] ABSTRACT

A fluoride glass basically containing ingredients of a P-Si-Al-alkaline-earth metals-alkali metals-F system within specific content ranges has extremely high anomalous partial dispersion and low dispersion properties and is stable without tendency to devitrification.

1 Claim, No Drawings

FLUORIDE GLASS

DETAILED DESCRIPTION OF THE INVENTION

This invention relates to a novel fluoride glass basically containing ingredients of a P-Si-Al-alkaline-earth metals-alkali metals-F system and being particularly suited for manufacture of super achromatic lenses.

In the design of super achromatic lenses, a first requirement for an optical material used for such lenses is that chromatic aberration can be readily corrected over a wide range of light wavelengths. It is also desirable for such optical material to be capable of reducing spherical aberration and, for facilitating manufacture of the lenses, to allow designing of a surface of refraction having a large radius of curvature.

For satisfying these requirements for the optical material used for manufacture of super achromatic lenses, it is not sufficient to use glass of normal dispersion in which Abbé number and partial dispersion ratio are in a linear proportional relationship to each other but an optical material having a high degree of anomalous partial dispersion characteristic and a greater Abbé number must be employed.

As a material possessed of such required properties, known in the art is crystalline fluorspar ($CaF_2$) which has the following excellent optical properties:
refractive index (Nd)=1.4339
Abbé number ($\nu d$)=94.9
partial dispersion ratio ($\theta gF$)=0.5383
anomalous partial dispersion ($\Delta \nu d$)=+31.3

Fluorspar, however, is so brittle, having tendency to cleavage, that processing of it is not easy. Besides, fluorspar is a very expensive material. Accordingly, various attempts have been made to explore materials replacing fluorspar. The specification of U.S. Pat. No. 2,511,224, for example, discloses glasses containing beryllium fluoride. These glasses, however, are extremely harmful to the human body, for they contain a toxic beryllium ingredient. There are also disclosed in Japanese laid-open patent publication No. 114412/1976 glasses of a fluorophosphate system, but they are by far inferior in optical properties to fluorspar.

It is therefore an object of the present invention to eliminate the above described disadvantages of the prior art optical materials and provide glass which has extremely high anomalous partial dispersion and low dispersion properties, i.e., $\Delta \nu d \geq +26$ and $\nu d \geq 90$ as specific target values, and is stable without tendency to devitrification.

Accumulated studies and experiments made by the inventor of the present invention have resulted in a finding which has led to the invention, that in making fluoride glasses by melting fluorides of various metals and various fluoride complexes, and oxygen compounds of various metals which may be added if necessary, a glass having extremely high anomalous partial dispersion and low dispersion properties and being stable without tendency to devitrification can be formed if amounts of ingredients of P, Si, Al, alkaline-earth metals and alkali metals contained in the glass are within specific limited ranges.

The fluoride glass made for achieving the above described object of the present invention contains as described in Claim appended to this specification, a composition in weight percent of 0.3-4.5% P, 0.2-3.5% Si, 7-12% Al, 0-8% Y, 0-9% Ln (Ln representing rare-earth elements), 0-3% As, 0-6% Sb, the total of said Al, Y, Ln, As and Sb being 7-28%, 0-4% Mg, 3.5-17% Ca, 5-20% Sr, 0-24% Ba, the total of said Mg, Ca, Sr and Ba being 17-41%, 0-1.5% Li, 0-5% Na, 0-5% K, the total of said Li, Na and K being 0.2-6%, 0-7% W, 42-54% F and 0-6% O, the total of the above described ingredients being over 97% of the entire composition.

Since the elements contained in the fluoride glass according to the invention are ionized when they are in a molten state, cations of respective metals and anions of fluorine ($F^-$) and oxygen ($O^{2-}$) existing in chemical equivalents corresponding to ionic valences of these cations can be contained employing materials of various structures. In the present specification, therefore, composition of the glass according to the invention is expressed in weight percent measured in terms of atom, for this is considered to be the most precise way of expressing the glass composition under the above described conditions.

In the glass made according to the present invention, the above described content ranges of the respective ingredients have been selected for reasons stated below.

In the fluoride glass according to the present invention the ingredient of P element has a remarkable effect for preventing devitrification of the glass as well as for increasing both positive anomalous partial dispersion and Abbé number. If, however, the content of P is less than 0.3%, the glass has tendency to devitrification whereas if the content exceeds 4.5% anomalous partial dispersion and Abbé number decrease below the desired values set in the invention.

In the fluoride glass according to the invention, the Si element ingredient is effective for preventing devitrification, increasing positive anomalous partial dispersion, decreasing refractive index and increasing chemical durability. If the content of Si is less than 0.2%, the glass has tendency to devitrification whereas if the content exceeds 3.5%, anomalous partial dispersion rather decreases and the devitrification tendency increases.

The Al, Y, Ln, As and Sb elements respectively contribute to reducing the devitrification tendency and stabilizing the glass as well as increasing chemical durability. The Al element ingredient particularly has such a remarkable effect for lowering temperature at which devitrification occurs and thereby stabilizing the glass that it is an essential ingredient for the glass according to the invention. If, however, the content of Al is outside of the range of 7-12%, the devitrification tendency rather increases than decreases. The elements of Y and Ln (i.e., La, Ce, Nd, Sm, Eu, Gd, Tb, Dy, Ho, Er, Tm, Yb, Lu, etc.) are effective not only for achieving the above described effects but also for maintaining a high positive anomalous partial dispersion characteristic so that these elements may be included in the glass. If, however, the content of Y exceeds 8% or a total content of one or more of the Ln elements exceeds 9%, the devitrification tendency rather increases. The As ingredient is effective for achieving the above described effects and also for increasing positive anomalous partial dispersion. If, however, the content of As exceeds 3%, it is liable to corrode a metal refractory such as platinum used for a glass melting crucible. The Sb ingredient is effective for achieving the above described effects and also for increasing positive anomalous partial dispersion. If, however, the content of Sb exceeds 6%, the devitrification tendency rather increases. Further, if a total content of the Al, Y, Ln, As and Sb ingredients is outside of the range of 7-28%, the devitrification tendency increases thereby making the glass instable.

The Mg, Ca, Sr, and Ba ingredients respectively contribute to preventing devitrification. Since this effect is particularly remarkable in the Ca and Sr ingredients, the two ingredients are made essential ingredients. If, however, the content of Ca is outside of the range of 3.5-17%, or the content of Sr is outside of the range of 5-20%, the devitrification tendency rather increases. The Mg and Ba ingredients are employed as optional ingredients. If the contents of Mg and Ba exceed 4% and 24% respectively, the devitrification tendency increases. If, further, a total content of the Mg, Ca, Sr and Ba is outside of the range of 17-41%, the devitrification tendency increases.

The Li, Na, and K ingredients are effective for preventing devitrification and decreasing refractive index. If, however, the contents of Li, Na and K exceed 1.5%, 5% and 5% respectively, the devitrification tendency rather increases than decreases. If a total content of one or more of the Li, Na and K ingredients is less than 0.2%, the devitrification tendency cannot be sufficiently prevented, whereas if the total content exceeds 6%, viscosity of the glass decreases and devitrification increases and further the anomalous partial dispersion characteristic and chemical durability both decrease.

The W ingredient is effective for preventing devitrification and solarization of the glass. If, however, the content of W exceeds 7%, the devitrification rather increases and Abbé number decreases below the desired value.

In the glass made according to the invention, the remainder of the composition after subtracting the total contents of the above described metal element ingredients consists of the F ingredient. A part of the F ingredient may be substituted, if necessary, by the O ingredient at a proportion of one O atoms to two F atoms to provide the glass with diversity in optical constants and increase the devitrification prevention effect and viscosity to facilitate forming of molten glass. If, however, the content of the O ingredient exceeds 6%, anomalous partial dispersion and Abbé number sharply decrease to values below the desired ones. The content of F in the glass made according to the invention is determined within the range of 42-54%.

As raw materials for manufacturing the fluoride glass according to the present invention, fluoride complex materials such as $R'PF_6$ ($R'$ representing an alkali metal element), $R_2'SiF_6$ and $RSiF_6$ (R representing an alkaline-earth metal element) and metal fluoride materials including such metals as Al, Y, Ln, Sb, R and R' are used. For obtaining the glass containing the O ingredient according to necessity, oxygen compound materials such as $H_3PO_4$, $P_2O_5$, metal phosphates, $SiO_2$, metal silicates, oxides of the same metals that are contained in the above described metal fluorides, $As_2O_3$ and $WO_3$ may be employed.

By adding metal elements of Ti, Pb, Zn, B, Ge, Ta and Nb to the glass up to about 3% in the form of fluoride complex salts, fluorides and oxides of these metal elements, diversity in optical constants and prevention of solarization can be achieved. It is also possible to add a small amount of chlorides, bromides and sulphates of the above described metals.

Examples (No. 1-No. 57) of compositions of the fluoride glass according to the invention are shown in Table 1 together with refractive indices (Nd), Abbé numbers ($\nu d$), partial dispersion ratios ($\theta gF$) and anomalous partial dispersion values ($+\Delta \nu d$) of such compositions. Further, examples of compositions of raw materials for producing these glass examples are shown in Table 2 in such a manner that the examples of the raw material compositions will correspond to the examples of the glass compositions shown in Table 1.

For determining anomalous partial dispersion ($\Delta \nu d$), a line passing on distribution points of normal dispersion glasses K7($\nu d=60.5$, $\nu gF=0.5434$) and F2($\nu d=36.3$ $\theta gF=0.5826$) is taken as a reference line in Abbé number ($\nu d$)—partial dispersion ($\theta gF$) coordinates. The anomalous partial dispersion ($+\Delta \nu d$) shown in Table 1 represents deviation in Abbé number ($\Delta d$) from this reference line with respect to the same $\theta gF$ value.

The glasses according to the invention as shown in these Tables can be manufactured by melting a batch of mixed raw materials at about 800° C.-1050° C. in a platinum crucible or the like melting apparatus applying a known atomsphere adjustment method for preventing evaporation of the ingredients, stirring the molten glass to homogenize it, lowering the temperature to about 600° C., casting the molten glass into a preheated mould, and thereafter annealing it.

As shown in Table 1, the glasses made according to the invention all have optical constants within ranges of $Nd=1.410-1.455$, $\nu d=90-101$, $\theta gF=0.52-0.55$ and $+\Delta \nu d=26-37$ which are within the desired values of the invention.

The composition of the fluoride glass according to the invention may be expressed in weight percent by compound as follows:

A fluoride glass containing a composition in weight percent of 1.22-18.30% $PF_5$, 0.74-12.96% $SiF_4$, 21.79-37.35% $AlF_3$, 0-13.12% $YF_3$, 0-12.69% $LnF_3$, 0-5.28% $AsF_3$, 0-8.80% $SbF_3$, the total of said $AlF_3$, $YF_3$, $LnF_3$, $AsF_3$ and $SbF_3$ being 21.79-63.09%, 0-10.25% $MgF_2$, 6.81-33.11% $CaF_3$, 7.16-28.67% $SrF_2$, 0-30.63% $BaF_2$, the total of said $MgF_2$, $CaF_2$, $SrF_2$ and $BaF_2$ being 24.82-71.92%, 0-5.60% LiF, 0-8.98% NaF, 0-7.71% KF, the total of said LiF, NaF and KF being 0.30-13.83% and 0-11.34% $WF_6$, the total of fluorine (F) in the above listed metal fluoride ingredients being 42-54%, the total of oxygen (O) substituted for fluorine (F) of one or more ingredients of the above listed metal fluorides being 0-6%, the total amount of the above-listed ingredients being 97-100%.

The fluoride glass according to the invention not only has the desirable optical constants as described above but has excellent resistivity to devitrification and chemical durability so that it is particularly suitable for manufacture and use as a material for super achromatic lenses.

Further, the fluoride glass according to the invention has extremely low refractive-low dispersive characteristic and, therefore, it can be used as a high performance laser glass having a small non-linear refractive index coefficient if it contains one or more rare-earth elements having functions of oscillating out and amplifying a laser beam.

TABLE 1
(Unit: Weight %)

| No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| P | 0.71 | 2.65 | 0.62 | 1.95 | 0.71 | 1.95 | 1.95 | 1.06 | 0.53 | 0.35 | 2.10 | 2.10 | 2.02 | 0.71 |
| Si | 1.81 | 1.81 | 0.30 | 1.41 | 0.30 | 1.81 | 2.01 | 2.01 | 0.30 | 0.30 | 3.33 | 2.01 | 0.91 | 0.30 |
| Al | 9.32 | 9.64 | 9.48 | 9.32 | 9.32 | 9.32 | 9.32 | 9.32 | 9.32 | 9.32 | 9.32 | 8.03 | 11.25 | 9.32 |
| Y | 4.88 | 2.44 | 4.88 | 4.88 | 3.65 | 4.88 | 4.88 | | 4.88 | 4.27 | 3.66 | 4.88 | 3.66 | 7.31 |
| La | 5.67 | | 5.67 | 4.25 | 2.84 | 1.42 | | 5.67 | 5.67 | 4.25 | 2.13 | 4.96 | | 5.67 |
| Sb | | | | | 5.45 | | | | | 3.41 | | | | 3.34 |
| Mg | 1.56 | 1.17 | 1.56 | 1.56 | 1.56 | 1.56 | 1.56 | 1.56 | 1.56 | 1.56 | 1.56 | 1.56 | 1.17 | 1.56 |
| Ca | 8.21 | 9.24 | 9.24 | 8.21 | 7.70 | 8.21 | 8.21 | 9.24 | 9.24 | 9.24 | 8.21 | 9.24 | 9.75 | 10.27 |
| Sr | 8.37 | 8.37 | 8.37 | 8.37 | 8.37 | 8.37 | 8.37 | 10.46 | 8.37 | 8.37 | 8.37 | 8.37 | 8.37 | 8.37 |
| Ba | 8.85 | 8.85 | 12.44 | 6.88 | 12.44 | 8.85 | 9.83 | 9.83 | 13.22 | 10.87 | 6.88 | 9.83 | 10.69 | 3.83 |
| Li | | | | | | | | | | | | | | |
| Na | 0.55 | | | | 0.55 | | | | | 0.55 | 3.15 | | 0.55 | 0.55 |
| K | 0.69 | 2.58 | 0.60 | 1.89 | 0.69 | 1.89 | 1.89 | 1.03 | 0.52 | 0.34 | 0.34 | 0.34 | 0.69 | 0.69 |
| F | 49.38 | 53.25 | 46.84 | 51.28 | 46.42 | 51.74 | 51.98 | 49.82 | 46.39 | 47.17 | 48.70 | 46.43 | 49.25 | 47.42 |
| O | 0.66 | | | | | | | | | | 2.25 | 2.25 | 1.69 | 0.66 |
| Total | 100.00 | 100.00 | 100.00 | 100.00 | 100.00 | 100.00 | 100.00 | 100.00 | 100.00 | 100.00 | 100.00 | 100.00 | 100.00 | 100.00 |
| N d | 1.42696 | 1.41150 | 1.42680 | 1.41682 | 1.41855 | 1.41329 | 1.41279 | 1.42373 | 1.42993 | 1.42310 | 1.42950 | 1.44651 | 1.42353 | 1.42587 |
| ν d | 97.0 | 100.6 | 98.6 | 99.2 | 99.7 | 100.3 | 100.7 | 98.1 | 97.5 | 98.9 | 94.4 | 93.0 | 97.4 | 97.5 |
| θgF | 0.5386 | 0.5330 | 0.5381 | 0.5333 | 0.5333 | 0.5364 | 0.5366 | 0.5324 | 0.5397 | 0.5371 | 0.5341 | 0.5354 | 0.5287 | 0.5355 |
| +Δνd | 33.6 | 33.7 | 34.9 | 32.5 | 33.0 | 35.5 | 36.1 | 30.9 | 34.8 | 34.5 | 28.2 | 27.6 | 27.9 | 32.2 |

| No. | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| P | 0.71 | 2.10 | 2.10 | 2.12 | 2.12 | 2.10 | 2.10 | 2.10 | 2.10 | 2.71 | 3.07 | 2.10 | 2.71 | 2.01 |
| Si | 0.30 | 1.81 | 1.81 | 2.21 | 0.40 | 2.11 | 0.60 | 1.92 | 0.58 | 2.01 | 1.92 | 0.40 | 1.01 | 1.71 |
| Al | 9.32 | 9.32 | 9.32 | 9.32 | 9.32 | 9.32 | 9.32 | 9.32 | 9.32 | 8.03 | 9.64 | 9.32 | 9.00 | 9.32 |
| Y | 6.09 | 4.88 | 4.88 | 5.48 | 4.27 | 4.88 | 4.27 | 4.88 | 1.83 | | 4.88 | 1.83 | 4.27 | 4.88 |
| La | 8.51 | 4.96 | 2.13 | 6.38 | 3.55 | 4.25 | 2.84 | 4.25 | | | 7.09 | | | 0.71 |
| Sb | 3.34 | | | | | | | | | | 1.67 | | | |
| Mg | 1.56 | | 3.12 | 1.56 | 1.56 | 1.56 | 1.56 | 1.56 | 1.17 | 1.56 | 1.17 | 1.56 | 1.17 | 1.56 |
| Ca | 10.27 | 10.27 | 8.21 | 4.11 | 16.43 | 9.24 | 8.21 | 12.32 | 7.19 | 10.27 | 7.70 | 7.70 | 10.27 | 8.21 |
| Sr | 8.37 | 8.37 | 8.37 | 9.07 | 9.07 | 5.58 | 19.53 | 9.07 | 8.37 | 13.95 | 8.37 | 7.67 | 8.37 | 8.37 |
| Ba | 2.26 | 8.85 | 8.85 | 10.81 | 1.97 | 10.32 | 2.95 | | 23.50 | 9.83 | | 23.90 | 11.18 | 8.36 |
| Li | | | | | | | | | | | | | 1.07 | |
| Na | 0.55 | | | | | | | 3.15 | 0.94 | 1.64 | 3.15 | | 0.52 | |
| K | 0.69 | 0.34 | 0.34 | 0.27 | 0.27 | 0.34 | 0.34 | 0.34 | 0.34 | 0.52 | 0.86 | 0.34 | | 4.86 |
| F | 47.37 | 46.85 | 48.62 | 46.42 | 48.79 | 48.05 | 46.03 | 48.84 | 42.41 | 46.66 | 47.33 | 42.93 | 48.18 | 47.76 |
| O | 0.66 | 2.25 | 2.25 | 2.25 | 2.25 | 2.25 | 2.25 | 2.25 | 2.25 | 2.82 | 3.15 | 2.25 | 2.25 | 2.25 |
| Total | 100.00 | 100.00 | 100.00 | 100.00 | 100.00 | 100.00 | 100.00 | 100.00 | 100.00 | 100.00 | 100.00 | 100.00 | 100.00 | 100.00 |
| N d | 1.42743 | 1.44332 | 1.43135 | 1.43715 | 1.43520 | 1.44277 | 1.42859 | 1.42887 | 1.43954 | 1.43453 | 1.43391 | 1.43937 | 1.43810 | 1.43015 |
| ν d | 96.9 | 93.7 | 95.3 | 94.2 | 95.2 | 93.8 | 96.3 | 94.3 | 94.9 | 93.9 | 92.3 | 95.3 | 94.0 | 94.7 |
| θgF | 0.5323 | 0.5329 | 0.5374 | 0.5323 | 0.5339 | 0.5381 | 0.5326 | 0.5429 | 0.5421 | 0.5378 | 0.5340 | 0.5336 | 0.5322 | 0.5308 |
| +Δνd | 29.6 | 27.2 | 31.2 | 26.9 | 28.9 | 30.1 | 29.2 | 32.6 | 33.7 | 30.0 | 26.1 | 28.8 | 26.6 | 26.5 |

| No. | 29 | 30 | 31 | 32 | 33 | 34 | 35 | 36 | 37 | 38 | 39 | 40 | 41 | 42 |
|---|---|---|---|---|---|---|---|---|---|---|---|---|---|---|
| P | 2.54 | 4.20 | 1.84 | 0.71 | 0.71 | 2.97 | 1.66 | 2.97 | 1.84 | 2.10 | 2.10 | 1.66 | 1.66 | 1.66 |
| Si | 1.81 | 1.81 | 1.81 | 1.81 | 0.40 | 1.41 | 1.46 | 2.01 | 1.81 | 1.71 | 1.81 | 1.01 | 1.01 | 1.01 |
| Al | 9.32 | 9.32 | 9.32 | 9.32 | 9.32 | 9.32 | 9.00 | 9.94 | 9.32 | 9.32 | 9.32 | 9.16 | 9.16 | 9.00 |
| Y | 2.44 | 2.44 | 4.88 | 4.88 | 4.88 | 4.88 | 4.27 | 3.66 | 3.66 | 6.30 | 4.27 | 3.05 | 3.05 | 4.27 |
| La | | | 2.13 | 1.42 | 2.84 | | 4.25 | | 5.67 | 5.67 | 6.82 | | | 3.55 |
| Sb | 3.34 | | | 5.01 | | | | | | | | | | |

TABLE 1-continued (Unit: Weight %)

| No | | | | | | | | | | | | | | | |
|---|---|---|---|---|---|---|---|---|---|---|---|---|---|---|---|
| Mg | 1.17 | 1.56 | 1.56 | 1.56 | 1.56 | 1.56 | 1.56 | 1.56 | 1.56 | 1.17 | 1.17 | 1.17 | 1.17 | 1.17 | 1.17 |
| Ca | 9.24 | 8.21 | 8.21 | 8.21 | 8.73 | 8.21 | 8.21 | 8.21 | 8.21 | 10.27 | 10.27 | 10.27 | 10.27 | 8.21 | 10.27 |
| Sr | 8.37 | 8.37 | 8.37 | 8.37 | 8.37 | 8.37 | 11.16 | 8.37 | 8.37 | 8.37 | 8.37 | 8.37 | 8.37 | 8.37 | 8.37 |
| Ba | 8.85 | 8.85 | 8.85 | 8.85 | 9.80 | 6.88 | 9.83 | 19.74 | 8.85 | 8.36 | 8.85 | 8.85 | 11.18 | 11.18 | 12.08 |
| Li | | | 0.55 | 0.55 | | | 0.55 | 0.55 | | | | | | | |
| Na | 4.38 | | 0.52 | 0.69 | | | 0.34 | 0.34 | | | | | | | 1.10 |
| K | 0.96 | | 0.69 | | | | | | | | 0.34 | | | | 0.34 |
| Sb | | | As 2.27 | | | | | | | | | | | | |
| W | | | | | 6.34 | 6.34 | | | | | | | | | |
| F | 48.10 | 45.49 | 47.27 | 47.63 | 44.70 | 43.98 | 44.98 | 45.43 | 47.95 | 44.11 | 44.92 | 45.29 | 45.36 | 44.65 | |
| O | 2.82 | 5.17 | 2.42 | 0.99 | 1.66 | 5.04 | 4.79 | 2.49 | 1.69 | 3.95 | 3.43 | 1.69 | 1.69 | 2.53 | |
| Total | 100.00 | 100.00 | 100.00 | 100.00 | 100.00 | 100.00 | 100.00 | 100.00 | 100.00 | 100.00 | 100.00 | 100.00 | 100.00 | 100.00 | |
| Nd | 1.41964 | 1.45146 | 1.43096 | 1.42334 | 1.43212 | 1.44568 | 1.44454 | 1.44248 | 1.43387 | 1.44687 | 1.44644 | 1.44120 | 1.44231 | 1.43756 | |
| νd | 94.7 | 90.7 | 95.1 | 97.1 | 92.5 | 90.2 | 92.6 | 93.5 | 94.7 | 92.3 | 92.8 | 93.7 | 91.8 | 94.3 | |
| θgF | 0.5305 | 0.5382 | 0.5342 | 0.5321 | 0.5353 | 0.5385 | 0.5354 | 0.5414 | 0.5415 | 0.5351 | 0.5364 | 0.5393 | 0.5424 | 0.5345 | |
| +Δνd | 26.3 | 27.0 | 29.0 | 29.7 | 27.1 | 26.7 | 27.2 | 31.7 | 33.1 | 26.7 | 28.0 | 30.7 | 30.7 | 28.4 | |

| No | 43 | 44 | 45 | 46 | 47 | 48 | 49 | 50 | 51 | 52 | 53 | 54 | 55 | 56 | 57 |
|---|---|---|---|---|---|---|---|---|---|---|---|---|---|---|---|
| P | 2.54 | 1.84 | 1.84 | 2.10 | 1.66 | 1.66 | 1.66 | 1.66 | 1.66 | 1.66 | 1.66 | 1.66 | 1.66 | 1.66 | 1.66 |
| Si | 0.91 | 1.81 | 1.81 | 1.71 | 0.91 | 0.91 | 0.91 | 0.91 | 0.91 | 0.91 | 0.91 | 0.91 | 0.91 | 0.91 | 0.91 |
| Al | 9.32 | 9.32 | 9.32 | 9.32 | 9.16 | 9.16 | 9.16 | 9.16 | 9.16 | 9.16 | 9.16 | 9.16 | 9.16 | 9.16 | 9.16 |
| Y | 4.27 | 3.66 | 3.66 | 5.59 | 3.66 | 3.66 | 3.66 | 3.66 | 3.66 | 3.66 | 3.66 | 3.66 | 3.66 | 3.66 | 3.66 |
| La | | 1.42 | 2.84 | 5.67 | | | | | | | | | | | |
| Mg | 1.17 | 1.17 | 1.56 | 1.56 | 1.17 | 1.17 | 1.17 | 1.17 | 1.17 | 1.17 | 1.17 | 1.17 | 1.17 | 1.17 | 1.17 |
| Ca | 9.75 | 8.73 | 8.21 | 8.21 | 10.27 | 10.27 | 10.27 | 10.27 | 10.27 | 10.27 | 10.27 | 10.27 | 10.27 | 10.27 | 10.27 |
| Sr | 8.37 | 8.37 | 8.37 | 8.37 | 8.37 | 8.37 | 8.37 | 8.37 | 8.37 | 8.37 | 8.37 | 8.37 | 8.37 | 8.37 | 8.37 |
| Ba | 10.69 | 8.85 | 8.85 | 8.36 | 10.69 | 10.69 | 10.69 | 10.69 | 10.69 | 10.69 | 10.69 | 10.69 | 10.69 | 10.69 | 10.69 |
| Li | 4.45 | 0.55 | 0.55 | | 0.27 | 0.27 | 0.27 | 0.27 | 0.27 | 0.27 | 0.27 | 0.27 | 0.27 | 0.27 | 0.27 |
| Na | 0.34 | 0.52 | 0.52 | | 0.34 | 0.34 | 0.34 | 0.34 | 0.34 | 0.34 | 0.34 | 0.34 | 0.34 | 0.34 | 0.34 |
| K | | Nd 4.30 | Nd 3.43 | 0.34 | Nd 6.86 | Sm 6.90 | Gd 6.94 | Tb 6.95 | Dy 6.97 | Ho 6.98 | Er 7.00 | Tm 7.01 | Yb 7.03 | Lu 7.04 | Gd 3.47 |
| | | | | | | | | | | | | | | | Lu 3.52 |
| F | 43.82 | 47.77 | 46.78 | 45.67 | 43.81 | 43.81 | 43.81 | 43.81 | 43.81 | 43.81 | 43.81 | 43.81 | 43.81 | 43.81 | 43.81 |
| O | 4.37 | 1.69 | 2.26 | 3.10 | 2.83 | 2.79 | 2.75 | 2.74 | 2.72 | 2.71 | 2.69 | 2.68 | 2.66 | 2.65 | 2.70 |
| Total | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 |
| Nd | 1.43057 | 1.43336 | 1.43404 | 1.44146 | 1.44197 | 1.44378 | 1.44400 | 1.44380 | 1.44077 | 1.44018 | 1.43974 | 1.43946 | 1.43887 | 1.44076 | 1.44227 |
| νd | 92.2 | 94.8 | 94.8 | 93.7 | 93.6 | 92.6 | 92.7 | 92.7 | 93.8 | 94.5 | 94.5 | 94.3 | 94.2 | 94.2 | 93.5 |
| θgF | 0.5353 | 0.5361 | 0.5349 | 0.5350 | 0.5381 | 0.5344 | 0.5335 | 0.5344 | 0.5319 | 0.5343 | 0.5322 | 0.5364 | 0.5322 | 0.5363 | 0.5350 |
| +Δνd | 26.8 | 29.9 | 28.5 | 28.1 | 29.9 | 26.6 | 26.1 | 26.7 | 26.3 | 28.4 | 27.0 | 29.6 | 26.8 | 29.4 | 27.9 |

TABLE 2
(Unit: Weight %)

| No. | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| $NaPF_6$ | 4.0 | | | | | | | | | | | | | | | | | | |
| $KPF_6$ | | 15.0 | 3.5 | 11.0 | 4.0 | 11.0 | 11.0 | 6.0 | 3.0 | 2.0 | 2.0 | 2.0 | 4.0 | 4.0 | 4.0 | 2.0 | 2.0 | 2.0 | 2.0 |
| $Na_2SiF_6$ | | | | | | | | | | | 10.0 | | | | | | | | |
| $BaSiF_6$ | 18.0 | 18.0 | 3.0 | 14.0 | 3.0 | 18.0 | 20.0 | 20.0 | 3.0 | 3.0 | 14.0 | 20.0 | 9.0 | 3.0 | 3.0 | 18.0 | 18.0 | 22.0 | 4.0 |
| $AlF_3$ | 29.0 | 30.0 | 29.5 | 29.0 | 29.0 | 29.0 | 29.0 | 29.0 | 29.0 | 29.0 | 29.0 | 25.0 | 35.0 | 29.0 | 29.0 | 29.0 | 29.0 | 29.0 | 29.0 |
| $YF_3$ | 8.0 | 4.0 | 8.0 | 8.0 | 6.0 | 8.0 | 8.0 | | 8.0 | 7.0 | 6.0 | 8.0 | 6.0 | 12.0 | 10.0 | 8.0 | 8.0 | 9.0 | 7.0 |
| $LaF_3$ | 8.0 | | 8.0 | 6.0 | 4.0 | 2.0 | | 8.0 | 8.0 | 6.0 | 3.0 | 7.0 | | 8.0 | 12.0 | 7.0 | 3.0 | 9.0 | 5.0 |
| $SbF_3$ | | | | | 8.0 | | | | | 5.0 | | | | | | | | | |
| $MgF_2$ | 4.0 | 3.0 | 4.0 | 4.0 | 4.0 | 4.0 | 4.0 | 4.0 | 4.0 | 4.0 | 4.0 | 4.0 | 3.0 | 4.0 | 4.0 | | 8.0 | 4.0 | 4.0 |
| $CaF_2$ | 16.0 | 18.0 | 18.0 | 16.0 | 15.0 | 16.0 | 16.0 | 18.0 | 18.0 | 19.0 | 16.0 | 18.0 | 19.0 | 20.0 | 20.0 | 20.0 | 16.0 | 8.0 | 32.0 |
| $SrF_2$ | 12.0 | 12.0 | 12.0 | 12.0 | 12.0 | 12.0 | 12.0 | 15.0 | 12.0 | 12.0 | 12.0 | 12.0 | 12.0 | 12.0 | 12.0 | 12.0 | 12.0 | 13.0 | 13.0 |
| $BaF_2$ | | | 14.0 | | 14.0 | | | | 15.0 | 12.0 | | | 8.0 | 3.0 | 1.0 | | | | |
| $LiF$ | | | | | | | | | | | | | | 1.0 | | | | | |
| $NaF$ | 1.0 | | | | 1.0 | | | | | | | | 1.0 | | 1.0 | | | | |
| $KF$ | | | | | | | | | | | | | | | | | | | |
| $P_2O_5$ | | | | | | | | | | | 4.0 | 4.0 | 3.0 | $Sb_2O_3$ 4.0 | $Sb_2O_3$ 4.0 | 4.0 | 4.0 | 4.0 | 4.0 |

| No. | 20 | 21 | 22 | 23 | 24 | 25 | 26 | 27 | 28 | 29 | 30 | 31 | 32 | 33 | 34 | 35 | 36 | 37 | 38 |
|---|---|---|---|---|---|---|---|---|---|---|---|---|---|---|---|---|---|---|---|
| $NaPF_6$ | | | | | | | | | | | | | | | | | | | |
| $KPF_6$ | 2.0 | 2.0 | 2.0 | 2.0 | 3.0 | 5.0 | 2.0 | 3.0 | 1.5 | 2.0 | 4.0 | 3.0 | 4.0 | 4.0 | 2.0 | 2.0 | 2.0 | 3.0 | 2.0 |
| $Na_2SiF_6$ | | | 10.0 | 3.0 | | 10.0 | | | | | | | | | | | | | |
| $BaSiF_6$ | 21.0 | 6.0 | | 10.0 | 20.0 | 30.0 | 4.0 | 10.0 | 17.0 | 18.0 | 18.0 | 18.0 | 18.0 | 4.0 | 14.0 | 7.5 | 20.0 | 18.0 | 17.0 |
| $AlF_3$ | 29.0 | 29.0 | 29.0 | 28.0 | 25.0 | | 29.0 | 28.0 | 29.0 | 29.0 | 29.0 | 29.0 | 29.0 | 29.0 | 29.0 | 28.0 | 26.0 | 29.0 | 29.0 |
| $YF_3$ | 7.0 | 7.0 | 8.0 | 7.0 | | 8.0 | 3.0 | 7.0 | 8.0 | 4.0 | 4.0 | 8.0 | 8.0 | 8.0 | 8.0 | 7.0 | 6.0 | 6.0 | |
| $LaF_3$ | 6.0 | 4.0 | 6.0 | 5.0 | | 10.0 | | | 1.0 | | | 3.0 | 2.0 | 4.0 | | 6.0 | | 8.0 | 8.0 |
| $SbF_3$ | | | | | | | | | | | | | | | | | | | |
| $MgF_2$ | 4.0 | 4.0 | 4.0 | 3.0 | 4.0 | 3.0 | 4.0 | 3.0 | 4.0 | 3.0 | 4.0 | 4.0 | 4.0 | 4.0 | 4.0 | 3.0 | 4.0 | 4.0 | 4.0 |
| $CaF_2$ | 18.0 | 16.0 | 24.0 | 14.0 | 20.0 | 15.0 | 15.0 | 20.0 | 16.0 | 18.0 | 16.0 | 16.0 | 16.0 | 17.0 | 16.0 | 20.0 | 16.0 | 16.0 | 16.0 |
| $SrF_2$ | 8.0 | 28.0 | 13.0 | 12.0 | 20.0 | 12.0 | 11.0 | 12.0 | 12.0 | 12.0 | 12.0 | 12.0 | 12.0 | 12.0 | 13.0 | 12.0 | 16.0 | 12.0 | 12.0 |
| $BaF_2$ | | | | 30.0 | | | 28.0 | 8.0 | | | | | | 10.0 | | 9.0 | | | |
| $LiF$ | | | | | | | | 4.0 | | | | | | | | | | | |
| $NaF$ | | | | | 3.0 | | | | 7.5 | 8.0 | 1.0 | 1.0 | 1.0 | | | | 1.0 | 1.0 | |
| $KF$ | | | | | | | | | 4.0 | 1.0 | | | | | | | | | |
| $P_2O_5$ | 4.0 | 4.0 | 4.0 | 4.0 | 5.0 | $Sb_2O_3$ 2.0 | 4.0 | 5.0 | | 5.0 | 8.0 $Sb_2O_3$ 4.0 | 3.0 $As_2O_3$ 3.0 | $Sb_2O_3$ 6.0 | $WO_3$ 8.0 | 6.0 $WO_3$ 8.0 | 3.0 $SiO_2$ 1.5 | 6.0 $Al_2O_3$ 3.0 | 3.0 | 4.0 $Y_2O_3$ 8.0 |

| No. | 39 | 40 | 41 | 42 | 43 | 44 | 45 | 46 | 47 | 48 | 49 | 50 | 51 | 52 | 53 | 54 | 55 | 56 | 57 |
|---|---|---|---|---|---|---|---|---|---|---|---|---|---|---|---|---|---|---|---|
| $NaPF_6$ | | | | | | | | | | | | | | | | | | | |
| $KPF_6$ | 2.0 | 2.0 | 2.0 | 2.0 | 2.0 | 3.0 | 3.0 | 2.0 | 2.0 | 2.0 | 2.0 | 2.0 | 2.0 | 2.0 | 2.0 | 2.0 | 2.0 | 2.0 | 2.0 |
| $Na_2SiF_6$ | | | | | | | | | | | | | | | | | | | |
| $BaSiF_6$ | 18.0 | 10.0 | 10.0 | 10.0 | 9.0 | 18.0 | 18.0 | 17.0 | 9.0 | 9.0 | 9.0 | 9.0 | 9.0 | 9.0 | 9.0 | 9.0 | 9.0 | 9.0 | 9.0 |
| $AlF_3$ | 29.0 | 28.5 | 28.5 | 28.0 | 29.9 | 29.0 | 29.0 | 29.0 | 28.5 | 28.5 | 28.5 | 28.5 | 28.5 | 28.5 | 28.5 | 28.5 | 28.5 | 28.5 | 28.5 |
| $YF_3$ | 7.0 | 5.0 | 5.0 | 7.0 | 7.0 | 6.0 | 6.0 | 4.0 | 6.0 | 6.0 | 6.0 | 6.0 | 6.0 | 6.0 | 6.0 | 6.0 | 6.0 | 6.0 | 6.0 |
| $LaF_3$ | | | | 5.0 | | 2.0 | 4.0 | 8.0 | | | | | | | | | | | |
| $SbF_3$ | | | | | | | | | | | | | | | | | | | |
| $MgF_2$ | 4.0 | 3.0 | 3.0 | 3.0 | 3.0 | 3.0 | 4.0 | 4.0 | 3.0 | 3.0 | 3.0 | 3.0 | 3.0 | 3.0 | 3.0 | 3.0 | 3.0 | 3.0 | 3.0 |
| $CaF_2$ | 16.0 | 16.0 | 16.0 | 20.0 | 19.0 | 17.0 | 16.0 | 16.0 | 20.0 | 20.0 | 20.0 | 20.0 | 20.0 | 20.0 | 20.0 | 20.0 | 20.0 | 20.0 | 20.0 |

TABLE 2-continued
(Unit: Weight %)

| | | | | | | | | | | | | | | | | | | | |
|---|---|---|---|---|---|---|---|---|---|---|---|---|---|---|---|---|---|---|---|
| SrF$_2$ | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 |
| BaF$_2$ | | 8.0 | 8.0 | | 8.0 | | | | 8.0 | 8.0 | 8.0 | 8.0 | 8.0 | 8.0 | 8.0 | 8.0 | 8.0 | 8.0 | 8.0 |
| LiF | | 0.5 | 0.5 | | | | | | | | | | | | | | | | |
| NaF | | | | 2.0 | | | | | 0.5 | 0.5 | 0.5 | 0.5 | 0.5 | 0.5 | 0.5 | 0.5 | 0.5 | 0.5 | 0.5 |
| KF | | | | | | 1.0 | 1.0 | | | | | | | | | | | | |
| | 4.0 La$_2$O$_3$ | 3.0 NdF$_3$ | 3.0 CeF$_3$ | 3.0 BaO | 5.0 Na$_2$O | 3.0 NdF$_3$ | 3.0 Nd$_2$O$_3$ | 4.0 Y$_2$O$_3$ | 3.0 Nd$_2$O$_3$ | 3.0 Sm$_2$O$_3$ | 3.0 Gd$_2$O$_3$ | 3.0 Tb$_2$O$_3$ | 3.0 Dy$_2$O$_3$ | 3.0 Ho$_2$O$_3$ | 3.0 Er$_2$O$_3$ | 3.0 Tm$_2$O$_3$ | 3.0 Yb$_2$O$_3$ | 3.0 Lu$_2$O$_3$ | 3.0 Gd$_2$O$_3$ |
| | | | | | | | | | | | | | | | | | | | 4.0 Lu$_2$O$_3$ |
| P$_2$O$_5$ | 8.0 | 12.0 | 12.0 | 8.0 | 6.0 | 6.0 | 4.0 | 4.0 | 8.0 | 8.0 | 8.0 | 8.0 | 8.0 | 8.0 | 8.0 | 8.0 | 8.0 | 8.0 | 4.0 |

What is claimed is:

1. A fluoride glass having optical constants within ranges of $Nd=1.410-1.455$, $\nu d=90-101$, $\theta gF=0.52-0.55$ and $+\Delta \nu d=26-37$ and having a composition in weight percent (measured in terms of atom) of 0.3-4.5% P, 0.2-3.5% Si, 7-12% Al, 0-8% Y, 0-9% Ln (Ln representing a rare-earth element or elements), 0-3% As, 0-6% Sb, the total of said Al, Y, Ln, As and Sb being 7-28%, 0-4% Mg, 3.5-17% Ca, 5-20% Sr, 0-24% Ba, the total of said Mg, Ca, Sr and Ba being 17-41%, 0-1.5% Li, 0-5% Na, 0-5% K, the total of said Li, Na and K being 0.2-6%, 0-7% W, 42-54% F, 0-6% O, the total amount of the above-listed ingredients being 97-100%.

* * * * *